United States Patent [19]

Cameron

[11] Patent Number: 4,936,391
[45] Date of Patent: Jun. 26, 1990

[54] ROTARY TILLER APPARATUS

[76] Inventor: G. Douglas Cameron, Box 1327 Assiniboia, Saskatchewan, Canada, S0H 0B0

[21] Appl. No.: 337,073

[22] Filed: Apr. 11, 1989

[51] Int. Cl.⁵ ........................ A01B 39/16; A01B 33/06
[52] U.S. Cl. ........................................ 172/78; 172/98; 172/111; 172/508
[58] Field of Search ................... 172/111, 98, 99, 125, 172/50 B, 7 B, 5; 56/10.4, 15.1, 15.2, 15.5

[56] References Cited

U.S. PATENT DOCUMENTS

| | | | |
|---|---|---|---|
| 2,791,953 | 5/1957 | Erickson et al. | 172/98 |
| 2,805,612 | 9/1957 | Beard | 172/111 X |
| 3,066,745 | 12/1962 | Smith et al. | 172/111 X |
| 3,117,632 | 1/1964 | Caggiano, Jr. | 172/111 X |
| 3,138,208 | 6/1964 | Simms | 172/111 X |
| 3,169,583 | 2/1965 | Thurow | 172/111 |
| 3,190,364 | 6/1965 | Maloney | 172/111 |
| 3,200,890 | 8/1965 | Courtway | 172/111 |
| 3,913,681 | 10/1975 | Lincoln et al. | 172/99 X |
| 4,043,401 | 8/1977 | van der Ley | 172/111 X |
| 4,287,955 | 9/1981 | Anderson | 172/111 X |
| 4,332,299 | 6/1982 | Parks et al. | 172/111 X |
| 4,491,183 | 1/1985 | Anderson et al. | 172/5 |
| 4,518,043 | 5/1985 | Anderson et al. | 172/78 X |
| 4,531,589 | 7/1985 | Williams | 172/99 X |
| 4,544,038 | 10/1985 | Schonert | 172/78 |

FOREIGN PATENT DOCUMENTS 198563 10/1986 European Pat. Off. ............. 172/98
1381569 11/1964 France .............................. 172/111

Primary Examiner—Randolph A. Reese
Assistant Examiner—Jeffrey L. Thompson
Attorney, Agent, or Firm—Adrian D. Battison; Stanley G. Ade; Murray E. Thrift

[57] ABSTRACT

A rotary tiller device for tilling around trees and other similar obstacles comprises a rotary tilling head with a plurality of tines extending slightly outwardly, downwardly and forwardly from a support which rotates around a vertical axis of the head. A central plate rests upon the ground and defines a tilling depth of the tines. A cover prevents the support from damaging the tree. A mounting system for mounting the unit on the belly of a yard tractor includes a pair of rails mounted in place of the removed belly mower and a hydraulic fluid reservoir tank which slides into position on the rails and defines a support for the tiller head. A linkage between the tank and the tiller head includes a six-bar lever system mounted upon a pivotal plate. The lever system is actuated by a hydraulic cylinder which drives the tiller head in a straight line outwardly and slightly forwardly of a line at right angles to the side of the tractor and in a plane which is generally horizontal and is defined by the plate member at the end of the tank. The straight line actuation of the lever system enables the tiller head to be readily manouevered around trees in a weeding action while the tractor continues in a constant direction.

23 Claims, 3 Drawing Sheets

ROTARY TILLER APPARATUS

BACKGROUND OF THE INVENTION

This invention relates to a rotary tiller apparatus for mounting on a tractor so as to extend outwardly to one side of the tractor.

Various previous designs have been manufactured for a rotary tiller apparatus of the type which includes a head rotatable about a vertical axis which drives a plurality of tines around the axis for engaging the ground in a weeding action. With the device projecting outwardly to one side of the tractor, the tractor can move forwardly so the device operates along a row. In many cases, however, it is desirable to move the device in and out relative to the tractor so that the head can weed around various obstacles such as trees.

Various previous designs are shown in the following U.S. Patents which have been identified by a search carried out in the U.S. Patent Office; U.S. Pat. No. 2,805,612 (Beard); U.S. Pat. No. 4,332,299 (Parks); U.S. Pat. No. 4,287,955 (Anderson); U.S. Pat. No. 3,190,364 (Maloney); 3,200,890 (Courtway); U.S. Pat. No. 3,117,632 (Caggiano); U.S. Pat. No.: 3,138,208 (Simms); U.S. Pat. No. 4,518,043 (Anderson); U.S. Pat. No. 4,544,038 (Schonert); U.S. Pat. No. 4,491,183 (Anderson).

Many of these devices obtain movement of the tiller head in a direction inwardly and outwardly of the tractor by pivoting a lever supporting the head about a vertical axis. This causes the head to move in a direction which is on an arc of a circle rather than in a straight line which makes it more difficult to control and prevents it from accurately weeding around an obstacle such as a tree. The Anderson patents show an arrangement in which movement inwardly and outwardly is obtained by pivoting of a lever about two horizontal axis so that the device moves generally inwardly and outwardly in a direction at right angles to the tractor side. However the movement of the lever also causes the device to be raised and lowered while it is moved inwardly and outwardly thus affecting the tilling action.

None of these devices have been found to be entirely satisfactory and alternate designs are required preferably one in which the movement of the tiller head is obtained in a straight line direction projecting outwardly to one side of the tractor without affecting the height of action of the tiller head. Furthermore, the mounting and drive to the previous devices from the supporting tractor has been unsatisfactory for application of the device to smaller type "yard" tractors.

SUMMARY OF THE INVENTION

It is one object of the present invention, therefore, to provide an improved design of rotary tiller apparatus which enables the tiller head to be moved inwardly and outwardly in a straight line direction projecting outwardly to one side of the tractor body, while the tiller head remains substantially in a horizontal plane.

It is a further object of the present invention to provide a rotary tiller apparatus of a type which can be readily mounted upon a yard type of tractor of the type which generally includes a belly mower with the tiller apparatus being mounted in place of the belly mower on the belly mower mounts.

According to a first aspect of the invention there is provided a rotary tiller apparatus for mounting on a tractor comprising a rotary tiller member including a rotary tiller head, a plurality of tines mounted on the head and extending downwardly therefrom for engaging the ground such that rotation of the head causes a tilling action on a portion of the ground engaged by the tines of the tiller head, mounting means for attachment to the tractor such that the tiller head is located at one side of the tractor for projecting outwardly to said one side thereof, a pivot member mounted on the mounting means for pivotal movement about a substantially horizontal axis for raising and lowering the tiller head relative to the mounting means, and linkage means extending from the pivot member to said tiller head for supporting the tiller head at a position extending outwardly to said one side of the tractor and for adjusting the distance of extension of the tiller head from the tractor in a substantially straight line direction projecting outwardly to one side of the tractor, the linkage means comprising a pivotal arm system having a first and second pair of parallel arms, pivot means connecting the arms to the pivot member and to the tiller head for pivotal movement about parallel axes substantially at right angles to the plane of movement of the tiller head such that the arm system is constrained to move in a common plane defined by the pivot member, a hydraulic cylinder connected to said arms to cause movement of the tiller head inwardly and outwardly, and tie rod means constraining the pivot arm system to cause the tiller head to move in said straight line extending outwardly to said one side of the tractor.

The linkage of the invention therefore provides a parallelogram type arm linkage which enables the tiller head to be moved inwardly and outwardly without changing vertical height or movement around an arc of a circle. The linkage includes stabilizer tie rods which extend from a bar forming the pivot member and from a bar on which the tiller head is mounted to respective ones of the arms. The arms arranged most preferredly is such that the straight line along which the head travels is slightly forwardly (approximately 13°) of a right angle to the direction of motion. This angle allows the device to move up to a tree and to be pulled inwardly and slightly backwardly away from the tree as the tractor continues to move forwardly.

According to a second aspect of the invention, there is provided a rotary tiller apparatus for mounting on a tractor comprising a rotary tiller member including a rotary tiller head, a plurality of tines mounted on the head and extending downwardly therefrom for engaging the ground such that rotation of the head causes a tilling action on a portion of the ground engaged by the tines of the head, mounting means for attachment to the tractor such that the tiller head is located at one side of the tractor for projecting outwardly to said one side thereof, a pivot member mounted on the mounting means for pivotal movement about a substantially horizontal axis for raising and lowering the tiller head relative to the mounting means, and linkage means extending from the pivot member to said tiller head for supporting the tiller head at a position extending outwardly to said one side of the tractor and for adjusting the distance of extension of the tiller head from the tractor in a substantially straight line projecting outwardly to one side of the tractor, the mounting means comprising a pair of rails for mounting horizontally on belly mower mounts of the tractor and a mounting member slidable onto the rails so that it can be supported on the rails and is readily removable therefrom, the mounting member comprising a tank defining a reservoir for hydraulic fluid, a hydraulic pump mounted having a pulley for driving the hydraulic pump, the pulley being arranged on the mounting member such that it can be driven by a belly mower drive system of the tractor.

The mounting of the device on rails attached to the belly mount of the tractor and including a hydraulic motor driven by the belt drive system of the belly mower enables the unit to be a self contained unit which can simply be attached to an existing tractor of the smaller yard tractor type without the necessity for more expensive three point hitch arrangements or hydraulic systems on the tractor itself.

According to a third aspect of the invention, there is provided a rotary tiller apparatus for mounting on a tractor comprising a rotary tiller member including a rotary tiller head, a plurality of tines mounted on the head and extending downwardly therefrom for engaging the ground such that rotation of the head causes a tilling action on a portion of the ground engaged by the tines of the head, mounting means for attachment to the tractor such that the tiller head is located at one side of the tractor for projecting outwardly to said one side thereof, a pivot member mounted on the mounting means for pivotal movement about a substantially horizontal axis for raising and lowering the tiller head relative to the mounting means, and linkage means extending from the pivot member to said tiller head for supporting the tiller head at a position extending outwardly to said one side of the tractor and for adjusting the distance of extension of the tiller head from the tractor in a substantially straight line projecting outwardly to one side of the tractor, the tiller head including a support plate member arranged to support an upper end of the tines in spaced relation around the plate member, the support plate member being arranged to support the tines such that each extends therefrom in a direction having a component axial to the plate member, a component radial to the plate member and a component angularly forwardly of the direction of rotation of the plate member such that a lower end of each tine lies on a circle of greater diameter than that of the plate member.

This arrangement allows the tiller head to closely approach a tree, for the tines to carry out a weeding action right up to the tree while the tine support member is prevented from damaging the tree at the trunk and for the device to be pulled away from the tree to move around the tree.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
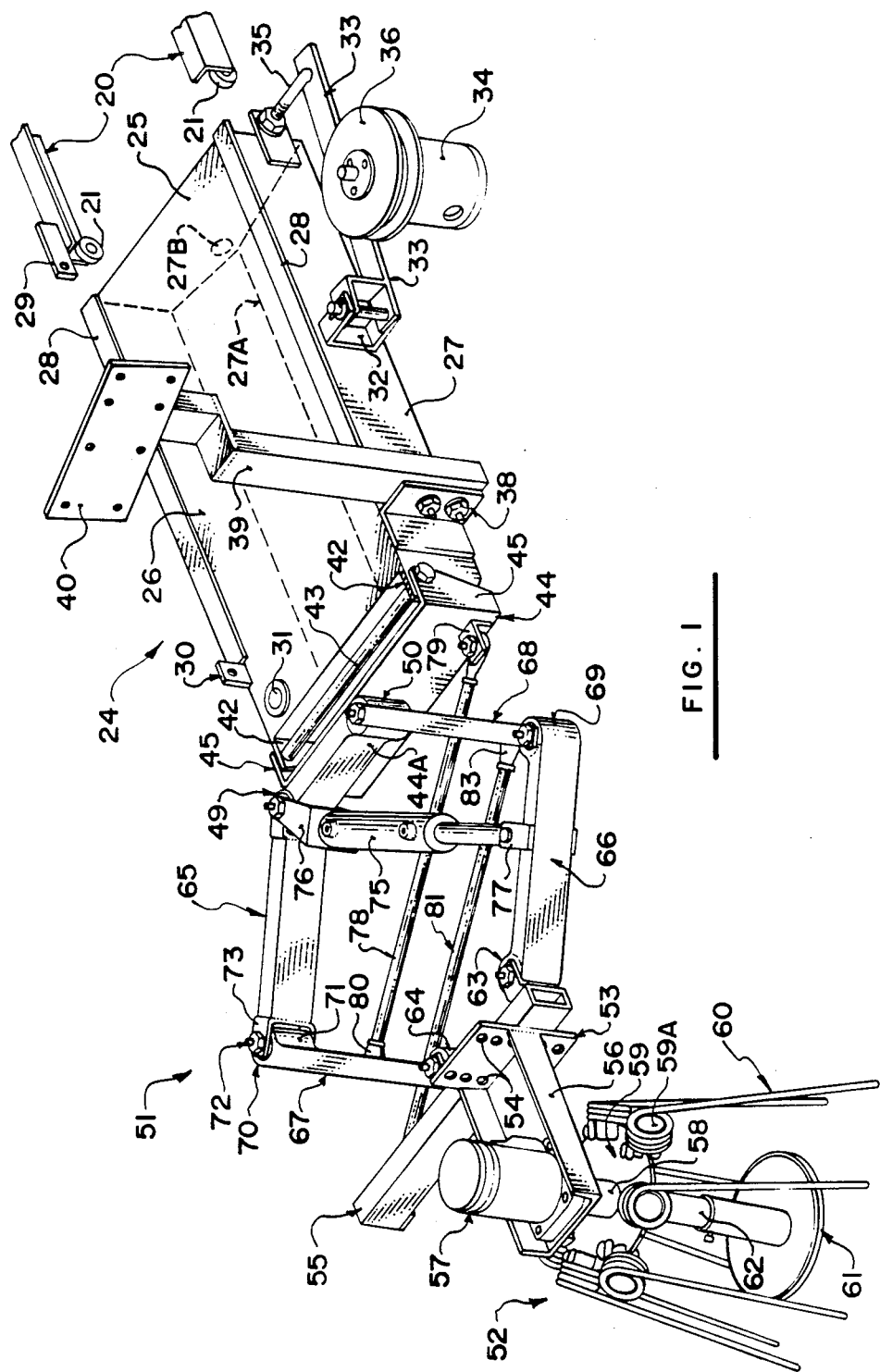
FIG. 1 is an isometric view of a rotary tiller according to the invention.

A tractor is generally indicated at 10 which is of the smaller yard type including rear ground wheels 11, front ground wheels 12, a seat 13, an engine compartment 14 and a frame 15 including running boards 16. The tractor is of the type which generally includes a belly mower carried underneath the central area of the tractor and driven by a pulley 17 of the engine.

The apparatus of the present invention comprises a rotary tiller apparatus which can be mounted in place under the belly of the tractor in place of the mower.

The apparatus comprises a pair of rails 20 each of which comprises an angle iron defining a vertical back plate and a horizontal top plate. At each end of the vertical back plate is provided a roller 21. The top plate includes means schematically indicated at 22 for attachment to the conventional belly mount of the mower when the mower deck is removed. Thus the rails are initially attached to the tractor with the remainder of the apparatus separate and free from the tractor for mounting thereon.

The remainder of the apparatus includes a mounting member generally indicated at 24 including a rectangular tank 25 with an upper plate 26, vertical sides 27 vertical end walls and a tapered or hopper bottom 27A. The top plate includes a pair of flanges 28 along each side edge arranged to extend partly out from the side thereof for cooperation with the rollers 21. Thus the flanges 28 can slide along the rails 20 over the top of the rollers 21 so that the tank 24 is held in place under the belly of the mower. When the flange 28 reaches the fully inserted position, a forwardly extending lug 29 on the rail 20 cooperates with an upward lug 30 on the tank to locate the tank fixed in position by a suitable locking pin (not shown). The tank includes a filler cap 31 by which it can be filled with hydraulic fluid as a reservoir. On a forward side wall 27 of the tank is mounted a pair of brackets 32 which support a transverse beam 33 which carries a hydraulic pump 34. One end of the beam 33 includes a pin 35 which can be adjusted to move the strut 33 inwardly and outwardly so as to move the hydraulic pump 34 forwardly and backwardly. The beam 33 is pivotal on the bracket 32 so that it can be rotated about a vertical axis to adjust the position of the pump from side to side across the tank to accomodate larger or smaller size tractors. The hydraulic pump carries a pulley 36 which can be driven by a belt 37 (FIG. 2) taking drive from the pulley 17 which normally drives the mower. The hopper bottom confines the fluid in the tank so that the return line 27B and a feed line not shown can be maintained under fluid to prevent starvation of the pump.

In addition the side 27 of the tank carries a further bracket 38 which supports a vertical strut 39 carrying a flat plate 40 which supports control levers 41 of the hydraulic system. The control levers are shown schematically in FIG. 2 and are omitted from FIG. 1 for convenience of illustration. The hydraulic circuit is also omitted from FIG. 1 for convenience of illustration but it will be appreciated that the hydraulic fluid from the pump 34 is controlled by the manual actuators 41 for supply from the pump to the various motors and cylinders as described hereinafter.

The front end of the tank 24 includes a pair of flanges 42 which project forwardly at the sides of the front end and carry a transverse pivot bar 43 which defines a pivot axis for a pivot plate 44. The pivot plate 44 includes a pair of side flanges 45 which wrap around the outside surfaces of the flanges 42 and cooperate with the rod 43 to allow pivotal movement of the plate 44 about a horizontal axis at the end of the tank. A hydraulic cylinder 46 has one end mounted on a bracket 47 on the rear side of the tank. The hydraulic cylinder includes a shaft 46A having a clevis 48 at the outer end for cooperation with one of the flanges 45 of the plate 44. Thus actuation of the cylinder 46 causes the plate 44 to move from a substantially vertical position as shown in FIG. 1 to a substantially horizontal position shown in FIG. 3.

A parallelogram arm linkage system generally indicated at 51 is mounted upon the plate 44 for projecting outwardly from the plate and supporting a tiller head generally indicated at 52.

The tiller head includes a vertical plate 53 with a plurality of openings 54 by which its height relative to a support beam 55 of the linkage can be adjusted. A channel bracket 56 extends outwardly from the plate 54 and provides a support for a hydraulic motor 57 driven from the pump 34. The hydraulic motor includes a drive shaft 58 which is connected to a dish shaped plate 59 carrying a plurality of tines 60. Each of the tines has an upper coil spring wrapped around and bolted to a sleeve 59A which is welded onto the plate 59.

The spring tines thus extend downwardly from the plate 59 into engagement with the ground. As the plate 59 is dished, the outer edge of the plate and thus the sleeve or stub shafts 59A are arranged at a shallow angle (10°) to the vertical. In this way the tines also have a component of direction slightly outwardly from the imaginary cylinder containing the circular periphery of the plate 59. In addition, the tines are arranged so that the lower end is angularly advanced relative to the upper end in the direction of rotation. Both of these components of direction cause the lower end to project out to a diameter greater than that of the sleeve 59A.

Rotation of the plate driven by the hydraulic motor causes the tines to rotate around the axis of the hydraulic motor to carry out a tilling or weeding action on the ground in a circular motion. A plate 61 is supported on a shaft 62 attached to the plate 59. The plate 61 is also slightly dished so that the undersurface thereof presents a convex surface for engaging the ground. The height of the dish 61 from the plate 59 can be adjusted by a telescopic action of the shaft 62. The length of the tines 60 beyond the undersurface of the dish 61 constitutes a working depth of the tines since the dish tends to sit on the surface of the ground while the tines dig into the ground beyond the dish to work the ground around the dish. A cover 60A is mounted on the head so as to be fixed to the head and extend over the rotating plate 59 and tines 60. For convenience of illustration, the cover is omitted from FIG. 1 but is visible in FIGS. 2 and 3. The cover forms a semi-cylindrical cover plate to prevent the sleeves 59A and the upper part of the tines from engaging and damaging a tree trunk or delicate shrub. The fact that the working position of the tines is of a larger diameter than the cover allows the tines to reach the tree root while the cover misses or just touches the trunk.

The linkage system generally indicated at 51 comprises the beam 55 and a parallel beam 44A mounted on the plate 44. The linkage further includes a first pair of arms 65 and 66 and a second pair of arms 67 and 68.

The arms and beams are connected to each other for pivotal movement at each joint provided by a suitable bearing arrangement 49, 50, 63, 64, 69 and 70. Each of the bearing arrangements as illustrated by example at 70 comprises a sleeve 71 welded to one of the parts, a pair of ball bearing arrangements (not shown) mounted within the sleeve, a central rod 72 mounted for rotation in the bearings, and a clevis 73 mounted on the other of the parts clamped to the rod for rotation therewith. Other bearing arrangements can be employed. Both ends of each of the arms 65 and 68 includes a clevis. The clevis of the inner end forms part of a respective one of the bearings 49 and 50. The clevis on the outer end of each of the arms 65 and 68 forms part of a respective one of the bearings 69 and 70 of arms 67 and 66. Both ends of the arms 66 and 67 carry a sleeve of the bearing system, the sleeves on the outer ends cooperating with respective clevises mounted on the beam 55.

The arms 65 and 66 are of the same length and similarly the arms 67 and 68 are of the same length. In the example shown all the arms are of equal length and the bearings 49 and 50 are spaced by the same distance as the spacing of the bearings 63 and 64 to form a symmetrical six-bar lever system. Thus the beam 55 can move inwardly and outwardly relative to the beam 44A from a fully collapsed position shown in FIG. 3 in which the bearings 49 and 64 and the bearings 50 and 63 are substantially in contact to an expanded position shown in FIG. 2 and vice-versa. A hydraulic cylinder 75 is connected from a clevis 76 mounted on the bearing 49 to a clevis 77 mounted on the lever 66 partly along its length. Operation of the cylinder 75 thus acts to force the linkage inwardly and outwardly depending upon the direction of operation of the cylinder. The clevis 76 is offset to one side to allow the linkage to collapse to a more compact position.

A first tie rod 78 extends from a lug 79 on the plate 44 to a coupling 80 on an inner face of the lever 67. Similarly a second tie rod 81 extends from a lug 82 on the end of the beam 55 remote from the plate 53 to a coupling 83 on the inner face of the lever 68.

In the absence of the tie rods 78 and 81, it will be appreciated that the linkage is uncontrolled in that the beam 55 would be able to twist and to move sideways to any position on application of a force along the length of the beam. The tie rods therefore act to control the motion of the linkage system so that a required direction of movement of the tiller head on the beam 55 is obtained. It will also be appreciated that the linkage system moves in a plane at right angles to the parallel axes of the bearings with the plane being defined by the attitude of the plate 44 about the pivot axis defined by the rod 43.

Figure 2:
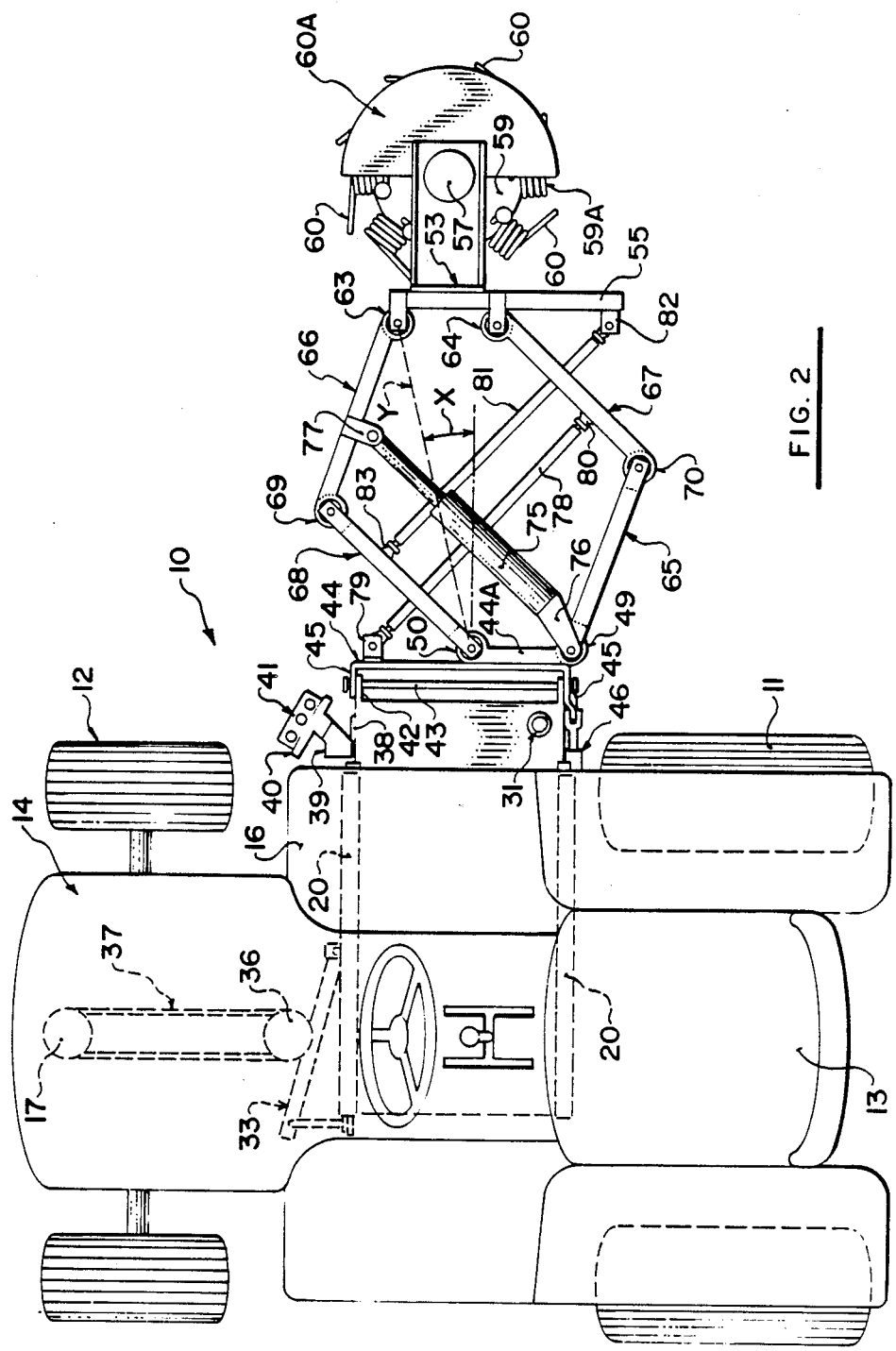
FIG. 2 is a top plan view of the apparatus of FIG. 1 mounted upon a tractor.

It will be noted particularly from FIG. 2 that the position of the coupling 83 on the arm 68 is offset from a mid point of the arm toward the bearing 69. Similarly the coupling 80 is offset from the mid point of the arm 67 towards the bearing 70. In addition it will be noted that the distance between the lug 79 and the bearing 50 is smaller than the distance between the lug 82 and the bearing 64.

In one example the ratio of a distance from the bearing 50 to the coupling 83 and from the coupling 83 to the bearing 69 is of the order of 5:3. The ratio of the position of the coupling 80 is same. In the same example the ratio of the distance between the lug 82 and the bearing 64 relative to the distance between the bearing 50 and the lug 79 is of the order of 7:6.

These ratios and positions of the tie rods render the system assymetrical so that the bearing 63 as it moves away from the bearing 50 does not move in a direction at right angles to the beam 44A but instead moves in a substantially straight line indicated as a dash line at Y which is at a shallow angle of the order of 13°, indicated at angle X, forwardly of a direction at right angles to the beam 44A.

In operation of the device, with the device in the extended position shown in FIG. 2, the tractor 10 can move along a row of trees, shrubs or the like with the tiller head operating in the rotating action to cause a weeding or tilling of the ground. If required the device can be pulled inwardly and outwardly as the device proceeds but generally the head is moving in a forward direction parallel to the movement of the tractor. When the device approaches a tree or similar obstacle, the tilling action can be brought up very close to the trunk at the ground while the dish 59 and upper part of the tine are spaced away from the trunk of the tree and the tree is protected by the cover 60A. As the tilling action actually reaches the tree, the operator can actuate the cylinder 75 to pull in the linkage system. The tilling head thus moves in a direction parallel to the line Y so that it moves inwardly and also rearwardly relative to the tractor direction. This part rearward movement acts to counteract the continued forward movement of the tractor so that the head moves inwardly while continuing in a tilling action without contacting or damaging the tree and can continue to till along the side of the tree until the tree is passed. At that point the device is moved outwardly again along the line Y. In this case the forward movement of the device is added to the forward movement of the tractor so that the head goes beyond the tree and continues tilling a position beyond the tree but leaving a space. This space can of course be tilled by carrying out a tilling action in the opposite direction from the other side of the trees so that in this case again the tilling action can be brought up close to or touching the near side of the tree as previously explained.

A careful analysis of the linkage system will show that the movement is not exactly in a straight line but the movement approximates to the straight line Y sufficiently accurately that the operator can, with a little practice, carry out tilling very close to the base of the tree without causing any damage to the tree. In addition the linkage remains in a plane defined by the plate 44 which is generally a horizontal plane so that the head moves directly outwardly and inwardly in a horizontal plane and in the linear direction.

Figure 3:
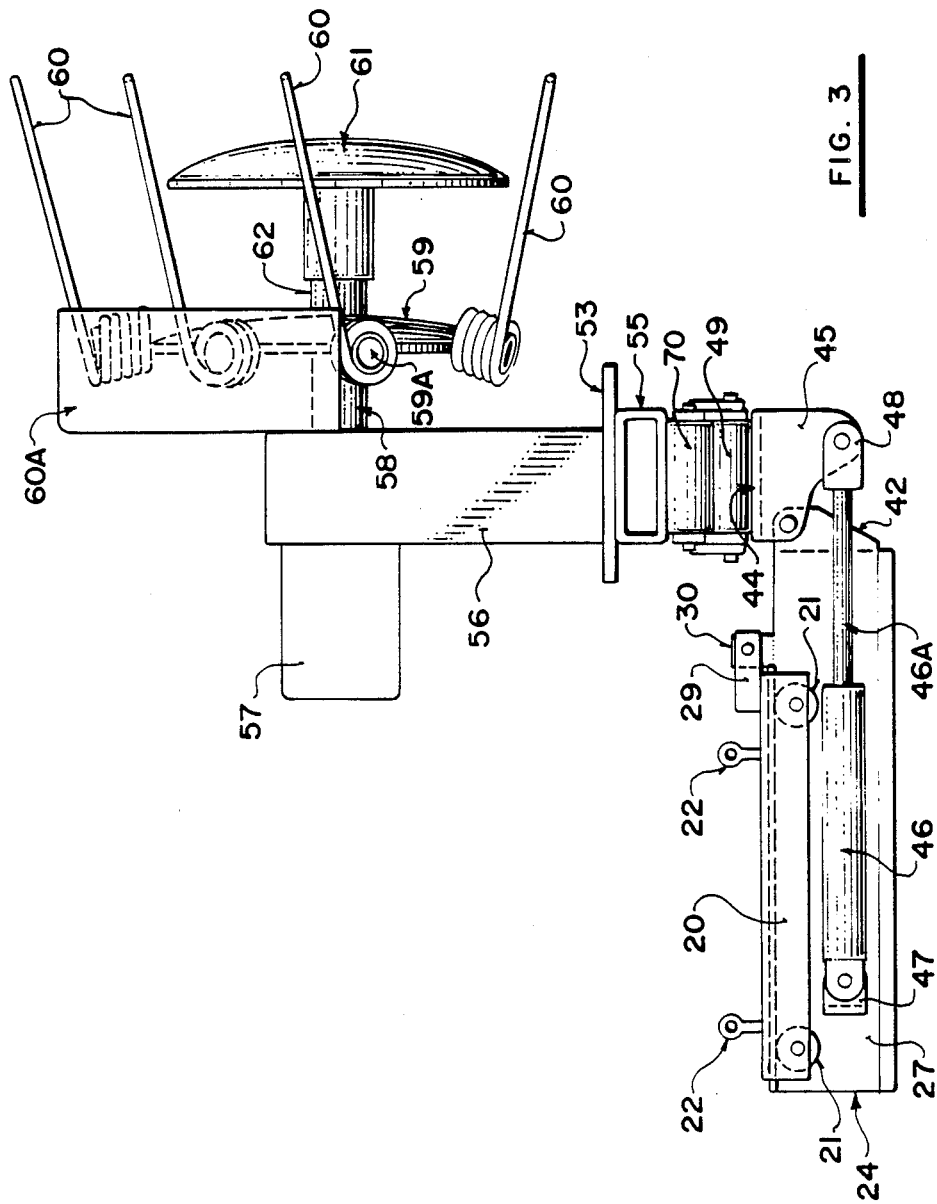
FIG. 3 is a rear elevational view of the apparatus of FIG. 1 mounted upon a tractor.

In a storage position of a device shown in FIG. 3, the linkage is moved to its fully collapsed position and the cylinder 46 actuated to move the plate 44 into a horizontal orientation thus raising the tiller head away from the ground and drawing it inwardly toward the tractor body.

In order to assist in moving the whole device from the tractor, the tank includes a pair of legs (not shown) which can be folded down to engage the ground as the tank is removed from the rail 20. Thus with the head in the storage position, the operator can simply disconnect the belt from the pump pulley, pull the holding pin and slide the device off the rails 20 onto the ground. The device can then be maintained in storage while the tractor is used for other purposes.

The device is shown attached to a simple yard type tractor where the drive system for the tractor is taken from a pulley at the base of the engine drive shaft. In other cases the unit can be mounted upon a larger size tractor. In cases where the tractor has a direct hydraulic system, the pump 34 can be bypassed and the hydraulic supply to the various control devices taken directly from the tractor.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A rotary tiller apparatus for mounting on a tractor comprising a rotary tiller member including a rotary tiller head, a plurality of tines mounted on the head and extending downwardly therefrom for engaging the ground such that rotation of the head causes a tilling action on a portion of the ground engaged by the tines of the tiller head, mounting means for attachment to the tractor such that the tiller head is located at one side of the tractor for projecting outwardly to said one side thereof, a pivot member mounted on the mounting means for pivotal movement about a substantially horizontal axis for raising and lowering the tiller head relative to the mounting means, and linkage means extending from the pivot member to said tiller head for supporting the tiller head at a position extending outwardly to said one side of the tractor and for adjusting the distance of extension of the tiller head from the tractor in a substantially straight line direction projecting outwardly to one side of the tractor, the linkage means comprising a pivotal arm system having a first and second pair of parallel arms, pivot means connecting the arms to the pivot member and to the tiller head for pivotal movement about parallel axes substantially at right angles to the plane of movement of the tiller head such that the arm system is constrained to move in a common plane defined by the pivot member, a hydraulic cylinder connected to said arms to cause movement of the tiller head inwardly and outwardly, and tie rod means constraining the arm system to cause the tiller head to move in said straight line extending outwardly to said one side of the tractor.

2. The invention according to claim 1 wherein one arm of each pair is equal in length to the other arm of the pair and wherein one arm of each of the pairs is pivotally coupled to the pivot member and the other arm of each of the pairs is pivotally coupled to the tiller member.

3. The invention according to claim 2 wherein the pivot member comprises an elongate first bar arranged to extend along one side of the tractor and wherein the tiller member includes an elongate second bar parallel to the first bar and wherein the arms are coupled to the first and second bars at spaced positions along the length of the bars.

4. The invention according to claim 3 wherein the hydraulic cylinder extends from a pivotal coupling of one arm of one of the pairs on one of the bars to a position on the other arm of the pair at a position partway along its length.

5. The invention according to claim 3 wherein said tie rod means includes a first tie rod extending from a position on said elongate first bar on one side of the coupling of said arms thereto to an opposed one of said arms of one of said pairs and a second tie rod substantially parallel to the first tie rod and extending from a position on said elongate second bar on a side of the coupling of said arms thereto, which side is opposed to that of the first tie bar to the other of said arms of said pair.

6. The invention according to claim 5 wherein the spacing of one of the tie bars from the adjacent coupling of the arm is different from that of the other.

7. The invention according to claim 5 wherein each tine comprises a helical coil spring portion coiled around an axis and a tine finger connected to one end of the coil spring portion and projecting generally radially from the axis, each coil spring portion being mounted on a support member such that the coil spring portions are spaced around the periphery of a circle and such that the axis of each coil spring portion extends generally radially of the circle and out of the plane of the circle so that the tine finger extends from the support member in a direction which includes a component parallel to the axis of the circle and a component radial of the circle, the position of the tine finger around the axis of the respective coil spring portion being arranged such that the tine finger extends with a component angularly forwardly relative to the direction of rotation of the head such that an outermost tip of each tine finger rotates on a circle of greater diameter than that of said circle and wherein the tiller head includes a plate member arranged at right angles to the axis of the circle for engaging the ground inside the tines such that the working depth of the tines is controlled by the distance of the end of the tines from the plate member.

8. The invention according to claim 7 wherein the support member is dish shaped and includes stub shafts on the periphery thereof each for supporting a respective tine coil spring portion.

9. The invention according to claim 1 wherein the arm system and tie rod means are arranged such that said straight line direction extends at an angle forwardly of a right angle to the direction of motion of the tractor.

10. The invention according to claim 9 wherein said angle is of the order of 13°.

11. The invention according to claim 1 wherein the mounting means comprises a pair of rails for mounting horizontally on an underside of the tractor and a mounting member slidable onto the rails so that it can be supported on the rails and is readily removeable therefrom.

12. The invention according to claim 11 wherein the rails are arranged for attachment to belly mower mounts of the tractor.

13. The invention according to claim 11 wherein the mounting member comprises a tank defining a reservoir for hydraulic fluid and a hydraulic pump mounted thereon having a pulley for driving the hydraulic pump, the pulley being arranged on the mounting member such that it can be driven by a belly mower drive belt of the tractor.

14. The invention according to claim 13 wherein the pivot member comprises a plate arranged to lie substantially parallel to one end of the tank, the plate including a pair of flanges at right angles thereto coupled to the tank for pivotal movement of the plate about said horizontal axis.

15. The invention according to claim 14 including a hydraulic cylinder mounted along one side of the tank for raising and lowering the pivot member about said horizontal pivot axis.

16. A rotary tiller apparatus for mounting on a tractor comprising a rotary tiller member including a rotary tiller head, a plurality of tines mounted on the head and extending downwardly therefrom for engaging the ground such that rotation of the head causes a tilling action on a portion of the ground engaged by the tines of the head, mounting means for attachment to the tractor such that the tiller head is located at one side of the tractor for projecting outwardly to said one side thereof, a pivot member mounted on the mounting means for pivotal movement about a substantially horizontal axis for raising and lowering the tiller head relative to the mounting means, and linkage means extending from the pivot member to said tiller head for supporting the tiller head at a position extending outwardly to said one side of the tractor and for adjusting the distance of extension of the tiller head from the tractor in a substantially straight line projecting outwardly to one side of the tractor, the mounting means comprising a pair of rails for mounting horizontally on belly mower mounts of the tractor and a mounting member slidable onto the rails so that it can be supported on the rails and is readily removable therefrom, the mounting member comprising a tank defining a reservoir for hydraulic fluid, a hydraulic pump mounted on the tank having a pulley for driving the hydraulic pump, the pulley being arranged on the mounting member such that it can be driven by a belly mower drive system of the tractor.

17. The invention according to claim 16 wherein the tank is substantially rectangular in plane and includes a hopper bottom to confine the fluid for feeding to the pump.

18. The invention according to claim 17 wherein the pivot member comprises a plate arranged to lie substantially parallel to one end of the rectangular hydraulic tank, the plate including a pair of flanges at right angles thereto coupled to the tank for pivotal movement of the plate about said horizontal axis.

19. The invention according to claim 16 including a hydraulic cylinder mounted along one side of the tank for raising and lowering the pivot member about said horizontal pivot axis.

20. A rotary tiller apparatus for mounting on a tractor comprising a rotary tiller member including a rotary tiller head, a plurality of tines mounted on the head and extending downwardly therefrom for engaging the ground such that rotation of the head causes a tilling action on a portion of the ground engaged by the tines of the head, mounting means for attachment to the tractor such that the tiller head is located at one side of the tractor for projecting outwardly to said one side thereof, a pivot member mounted on the mounting means for pivotal movement about a substantially horizontal axis for raising and lowering the tiller head relative to the mounting means, and linkage means extending from the pivot member to said tiller head for supporting the tiller head at a position extending outwardly to said one side of the tractor and for adjusting the distance of extension of the tiller head from the tractor in a substantially straight line projecting outwardly to one side of the tractor, the tiller head including a tine support member arranged to support the tines, each tine comprising a helical coil spring portion coiled around an axis and a tine finger connected to one end of the coil spring portion and projecting generally radially from the axis, each coil spring portion being mounted on the support member such that the coil spring portions are arranged in spaced relation around a circle defined by the tine support member and such that the axis of each coil spring portion extends generally radially of the circle and is inclined upwardly and outwardly out of the plane of the circle so that the tine finger extends therefrom in a direction having a component axial to the plate member and a component radial to the plate member, the position of the tine finger around the axis of the respective coil spring portion being arranged such that the tine finger extends with a component angularly forwardly of the direction of rotation of the tine support member such that a lower end of each tine lies on a circle of greater diameter than that of the tine support member.

21. The invention according to claim 20 wherein the tine support member is dished and includes a plurality of stub shafts extending outwardly therefrom at an upwardly inclined angle to define the direction of the axis of a respective one of the tine coil spring portions mounted thereon.

22. The invention according to claim 20 including a stationary cover member at least partly surrounding the support plate member.

23. The invention according to claim 20 wherein said linkage means is arranged such that the straight line extends at an angle slightly forwardly of a direction at right angles to the direction of motion of the tractor.

* * * * *